Dec. 7, 1954  G. P. SMITH  2,696,577
ELECTRICAL CONDENSER MANUFACTURE
Filed Jan. 10, 1951

Inventor
GAIL P. SMITH
By Rolf E. Schneider
Attorney

2,696,577

ELECTRICAL CONDENSER MANUFACTURE

Gail P. Smith, Corning, N. Y., assignor to Corning Glass Works, Corning, N. Y., a corporation of New York Application January 10, 1951, Serial No. 205,323

2 Claims. (Cl. 317—261)

This invention is concerned with an improvement in the type of condenser disclosed in my Patents No. 2,405,529, issued August 6, 1946, and No. 2,526,703, issued October 24, 1950, and in the Bair Patent No. 2,526,704, issued October 24, 1950.

As described in these patents, such condenser consists of a plurality of thin glass films separated by thin metal foils which alternately project beyond two opposite edges of the glass films and are embedded therebetween. Production of condensers of this type, as detailed in such patents, initially involves the formation of laterally spaced vertical stacks of sheets of the metal foil arranged in the indicated fashion between continuous strips of the glass film. The resulting assembly is then heated and subjected to pressure to form a unitary fused or bonded body, which can be separated into the individual condenser units in any appropriate manner.

While this condenser unit can be employed as is, it is frequently necessary to attach leads of metal ribbon or wire to the respective groups of projecting metal foil sheets in order to conveniently connect the condenser into a circuit, for example. It then becomes desirable to provide support for such lead ribbons or wires and protection for the joint or union between the leads and the respective metal foil groups so that damage to the condenser unit during service can be avoided.

The use of relatively thick flat-glass cover strips, wider than the condenser unit and similar to the thicker glass strips proposed in the Bair patent for the two exterior glass strips of the condenser assembly, has been suggested for this purpose. Such flat cover strips are not particularly desirable, however, since, upon fusion, the leads are held only loosely in place and can work free too easily.

This difficulty can be overcome by providing narrow strips of glass film along the edges of the thick flat-glass cover strips between such strips and the leads. While the leads are thereby more firmly held in place, this arrangement has the disadvantage that each lead, upon flexing, is constrained to bend around a sharp corner of glass with the result that not only does the glass supporting case or cover become broken, but the leads themselves are thereby weakened and tend to break more easily. Such characteristics obviously constitute serious drawbacks to the utility of such glass condenser under operating conditions involving any substantial amount of vibration of the condenser or repeated flexing of its leads.

I have now discovered that the desired support and protection can be satisfactorily obtained, with substantial avoidance of cover and lead breakage under even severe service conditions, by providing that the leads, upon bending, come in contact only with convexly rounded or beaded edges. In accordance with my invention, the condenser unit is encased between two opposed shaped covers, each of which is provided along its lateral edges with beads or ribs that extend or project along the sides of the unit so that the opposed beads are in contact with each other and thereby provide convexly rounded surfaces over which the free ends of the lead wires are bent upon flexing.

The details of the present invention will be readily apparent from the following description thereof taken in connection with the accompanying drawing, in which.

Figure 1:
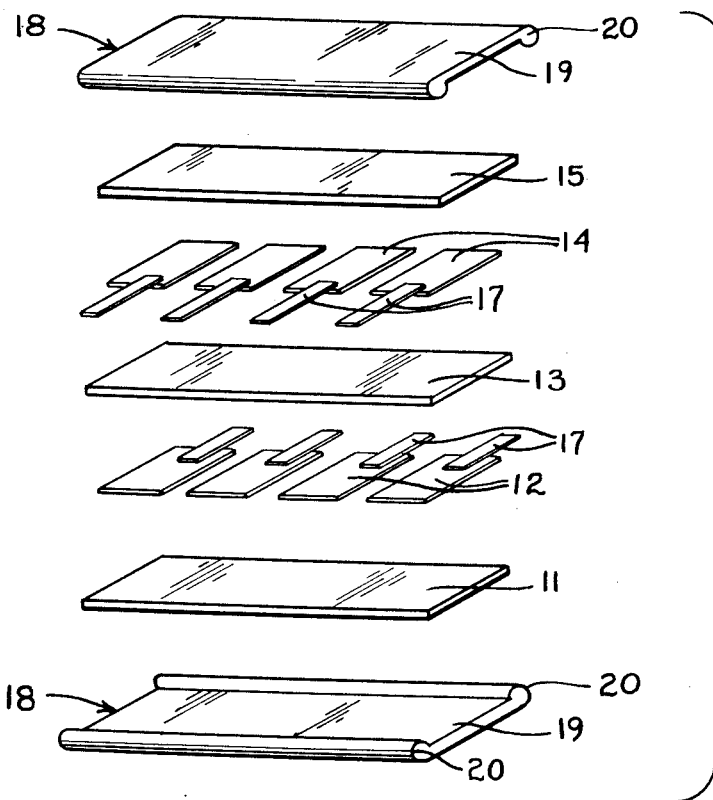
Fig. 1 is an exploded perspective view of an assembly of condenser units provided with shaped cover strips in accordance with the invention.

As described in the indicated patents and as shown in Fig. 1, the assembly of condenser units includes a strip 11 of thin glass film on which there is arranged in lateral spaced relationship a plurality of metal foil sheets 12 with one edge of each sheet set inward from the corresponding lateral edge of film strip 11 and with the opposite edge of each sheet projecting beyond the corresponding opposite lateral edge of strip 11. A second glass film strip 13 is superimposed on foil sheets 12 in vertical alignment with strip 11. Arranged on strip 13 in a laterally spaced relationship similar to that of sheets 12 and in vertical register therewith is a second series of metallic foil sheets 14 which, however, project in the direction opposite to that of sheets 12. A third strip 15 of thin glass film is positioned over sheets 14 in vertical alignment with strips 11 and 13. (While the number of alternate layers of glass film and metal foil is of course determined by the desired capacitance, for convenience a condenser having only two layers of metal foil sheets is shown.)

Ribbon or wire leads 17 are attached as by spot-welding to the oppositely projecting portions of the foil sheets 12 and 14 of each condenser unit. Where the lead comprises wire, its end may be conveniently flattened or otherwise shaped to facilitate such connection. To avoid displacement of the several parts of the condenser units during their assembly and during the attachment of the leads to the foil sheets, an adhesive such as diphenyl, which is capable of volatilization upon heating to a temperature below that utilized in the subsequent sealing operation, may be employed to temporarily secure such parts in their proper relationship.

According to the present invention, the resulting assembly of condenser units is enclosed in two opposed shaped cover-glass strips 18, each of which comprises a flat body portion 19 provided along each lateral edge with a bead or rib 20. Enclosure may be conveniently accomplished by first forming the assembly of condenser units as indicated and then positioning such assembly between the two cover-glass strips. The enclosed assembly may also be built up by initially positioning glass film strip 11 between the beads of one cover-glass strip 18, forming the assembly of condenser units thereon in the indicated manner, and then finally placing the other cover-glass strip 18 over the completed assembly with the respective leads 17 projecting from between the opposed beads 20 of the cover strips.

The enclosed assembly is then subjected to heat and pressure in accordance, for example, with the teachings of the above patents to provide a unitary fused body or mass. Separation of such fused body to obtain the individual condenser units can be effected in any appropriate manner, as by the procedures disclosed in the above-mentioned patents.

Figure 2:
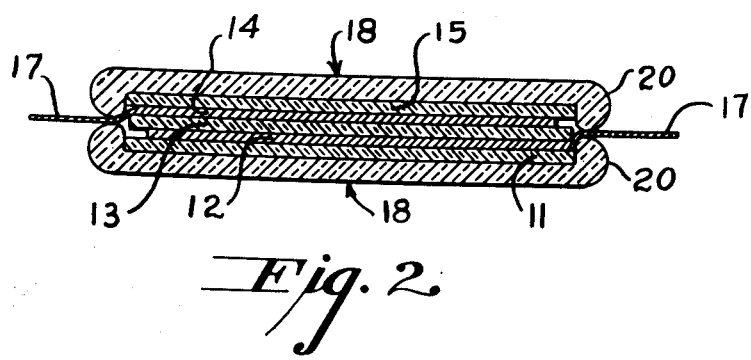
Fig. 2 is an enlarged sectional view through one of the condenser units of the assembly shown in Fig. 1.

As indicated in Fig. 2, the spacing of beads 20 is desirably such as to just nicely accommodate the condenser unit assembly. While such beads may extend or project beyond the flat body portion 19 for a distance greater or less than half the thickness of the condenser unit assembly itself, it is only necessary that the opposing beads abut each other so that such assembly is snugly encased between the two cover strips and the lead wires are firmly anchored therebetween. The beads are advantageously of such width that they overlie the joint or connection between the metal foil sheets and the respective leads and thereby prevent damage to such joint or tearing of the foil sheets during use of the condenser. The thickness of the cover glass may be greater or less than that of the condenser unit itself in accordance with the contemplated service conditions and/or the size of the over-all condenser or its leads.

To facilitate fusion of the enclosed assembly, film strips 11, 13, and 15 and cover strips 18 are made of the same glass. It is necessary then, to heat the enclosed assembly only to a temperature, generally no more than slightly in excess of the softening point of the glass, sufficient to permit satisfactory fusion of the several glass parts under the applied pressure, which should be such as to effect the desired bond but not such as to eliminate the roundness of the beads, especially in the areas contacted by the leads upon flexing.

Because of the rounded surfaces presented by beads 20 from between which they extend, leads 17, upon being flexed, must form an arcuate bend rather than a sharp-angled bend. The result is that the leads in a glass condenser embodying the present invention may be repeatedly bent without material danger of breakage of the condenser body, and that the serviceable life of a condenser of the present type can be considerably prolonged.

As will be apparent, it is possible, if found desirable, to omit the exterior glass film strips such as 11 and 15 and to have the cover-glass strips 18 themselves serve as the exterior glass strips of the condenser assembly. It is also possible, of course, to form a fused condenser unit in accordance with the teachings of the above-mentioned patents, thereafter encase the fused unit between two of the present cover glasses, and then fuse the encased assembly into a unitary mass.

By way of comparison with a condenser provided with brass lead wires and the built-up cover indicated above, a similar condenser made, however, in accordance with the instant invention can withstand approximately twice as many lead-wire flexing cycles, in which the lead wire is bent back and forth through an angle of approximately 180° in a plane perpendicular to that of the condenser, and will then fail only due to fatigue of the lead wires themselves. Moreover, no damage to the condenser structure, as inevitably encountered in the build-up arrangement, is apparent.

I claim:

1. An electrical condenser comprising a vertical stack consisting of a plurality of thin glass films separated by thin, metal foils bonded to said films and alternately projecting beyond two opposite edges thereof to form terminals, a flexible lead joined to each group of projecting metal foil terminals, and a vitreous casing surrounding and integrally united with said stack, said vitreous casing having opposite lateral portions in which are embedded the metal foil terminal-flexible lead junctures, each said lateral portion having a side wall composed of parallel continuously convex surfaces so arranged that a flexible lead extends outwardly therebetween at a point along their medial line, said convex surfaces being of such radii that the bending stress generated by flexing of such outwardly extending lead is distributed over a substantial portion of that lead.

2. The method of manufacturing condensers, which includes forming a vertical stack consisting of a plurality of thin glass films separated by thin metal foils which alternately project beyond two opposite edges of the glass films, attaching a flexible lead to each group of projecting metal foils, enclosing the glass film-metal foil stack between two opposed glass covers of substantially similar shape, each such cover having formed along its lateral edges enlarged portions having a convexly curved surface, said stack being so positioned between such covers that each enlarged lateral portion of one cover lies adjacent a similar portion on the opposed cover and the two portions overlie a metal foil-flexible lead juncture, heating the resulting assembly to a temperature sufficient for integral pressure-bonding but below that at which physical definition of the curved cover surfaces would be lost through glass flow, and subjecting the heated assembly to pressure to form a unitary fused mass.

References Cited in the file of this patent

UNITED STATES PATENTS

| Number | Name | Date |
|--------|------|------|
| 607,315 | Wingard | July 12, 1898 |
| 1,830,907 | Kindl | Nov. 10, 1931 |
| 2,043,851 | Grant | June 9, 1936 |
| 2,166,205 | Anderson et al. | July 18, 1939 |
| 2,184,841 | Katsch | Dec. 26, 1939 |
| 2,405,529 | Smith | Aug. 6, 1946 |
| 2,526,704 | Bair | Oct. 24, 1950 |